United States Patent
Anson

(10) Patent No.: US 7,658,498 B2
(45) Date of Patent: Feb. 9, 2010

(54) SYSTEM AND METHOD FOR AUTOMATED DISPLAY ORIENTATION DETECTION AND COMPENSATION

(75) Inventor: Chad R. Anson, Austin, TX (US)

(73) Assignee: Dell Products, Inc., Round Rock, TX (US)

( * ) Notice: Subject to any disclaimer, the term of this patent is extended or adjusted under 35 U.S.C. 154(b) by 614 days.

(21) Appl. No.: 11/457,169

(22) Filed: Jul. 13, 2006

(65) Prior Publication Data

US 2008/0013053 A1    Jan. 17, 2008

(51) Int. Cl.
*G03B 21/14* (2006.01)
(52) U.S. Cl. .................... 353/69; 353/70; 353/119; 248/542
(58) Field of Classification Search ............ 353/69, 353/70, 119; 248/542
See application file for complete search history.

(56) References Cited

U.S. PATENT DOCUMENTS 6,483,555 B1    11/2002    Thielemans et al. ......... 348/745
6,520,647 B2 *   2/2003    Raskar ......................... 353/70
6,811,264 B2    11/2004    Raskar et al. ................. 353/94
6,877,863 B2 *   4/2005    Wood et al. .................... 353/70
2002/0093627 A1 * 7/2002   Oehler .......................... 353/69
2004/0061995 A1 * 4/2004   McMahon ................... 361/681

OTHER PUBLICATIONS http://www.epson.com/cmc_upload/0/000/050/641/P830-835_c18145R2.pdf "Epson PowerLite® 830p and 835p—Two ultimate solutions for high-performance presentations." Epson America, Inc. and Epson Canada Ltd., printed Aug. 9, 2006 (4 pages).
www.lcdprojectoronline.com/c170.html "C170-Proxima DLP Projector—C170 (C170)" printed Aug. 4, 2006 (2 pages).

\* cited by examiner

*Primary Examiner*—Georgia Y Epps
*Assistant Examiner*—Jerry Brooks
(74) *Attorney, Agent, or Firm*—Hamilton & Terrile, LLP; Robert W. Holland

(57) ABSTRACT

Automated orientation of an image presented by a display, such as a projector, with the orientation of the display simplifies presentation of images generated by an information handling system. A display orientation sensor detects the orientation of a display so that a display orientation module automatically adjusts the orientation of an image presented by the display to align with the display orientation. For example, display orientation is sensed by an accelerometer associated with the display or by determining the attachment point of the display to a support.

5 Claims, 4 Drawing Sheets

SYSTEM AND METHOD FOR AUTOMATED DISPLAY ORIENTATION DETECTION AND COMPENSATION

BACKGROUND OF THE INVENTION

1. Field of the Invention

The present invention relates in general to the field of information handling system displays, and more particularly to a system and method for automated display orientation detection and compensation.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, networking systems, display devices and consumer electronic devices.

As information handling systems grow in capability, they also tend to grow in complexity. Information handling system manufacturers have responded to this increased complexity by attempting to simplify the setup and operation of information handling systems, sometimes referred to as the end user's out-of-box experience. By reducing the number and complexity of setup steps, manufacturers seek to create greater end user satisfaction and to reduce end user reliance on relatively expensive technical assistance provided by telephone representatives.

Information handling system display setup sometimes presents extra challenges for end users. For instance, displays are sometimes setup to present visual information in orientations that differ from an initial expected orientation. As an example, some projector displays are designed to rest on a tabletop and project an image at a screen under normal operating conditions. Instead, the projector may be hung inverted from a ceiling in an installed operating condition. When the projector hangs inverted, the image presented by the projector should also be inverted by the projector image processing system so that the image presented at the screen is upright. Projectors are typically shipped with a default setting to present an upright image in the tabletop configuration. An interface, such as a service menu, accessible through buttons on the projector or through the information handling system allows an end user to selectively invert the image if the projector is installed in a ceiling configuration. The end user may also invert the image back to its original setting if the projector is moved from the ceiling to the tabletop configuration. Unfortunately, the need to invert the projector image is typically not apparent to an end user until the projector is installed and presenting an upside down image of the service menu, which is difficult for the end user to navigate. Similar difficulties arise for other types of displays that present images in various orientations.

SUMMARY OF THE INVENTION

Therefore a need has arisen for a system and method which automatically adjusts an information handling system display to present an upright image orientation in various display orientations.

In accordance with the present invention, a system and method are provided which substantially reduce the disadvantages and problems associated with previous methods and systems for adjusting an information handling system display presentation based on display orientation. The orientation of a display, such as a projector, is sensed at the display and applied to adjust visual information presented by the display. An image presented by the display remains at a desired orientation, such as aligned with an upright vertical axis, while the orientation of the display is changed, such as to an inverted orientation.

More specifically, a display orientation sensor associated with a display automatically determines the orientation of the display, such as an upright or inverted orientation. In one embodiment, the display orientation sensor is an accelerometer that senses the vector of gravitational pull and determines the display orientation by analysis of the offset between a predetermined vector and the sensed gravitational vector. In an alternative embodiment, a mechanical sensor, such as a pressure sensor, senses coupling of the display to a support to determine the display orientation. For example, coupling of a support frame to a projector indicates installation of the projector in an installed inverted orientation. A display orientation module interfaces with the display orientation sensor and automatically adjusts the image presented at the display according to the display orientation. For example, a projector installed in an inverted orientation produces an inverted image that appears upright. In one embodiment, angular difference between display orientation and a display surface assumed to be aligned with a sensed gravitational vector is used to provide keystone correction of the output image from the display.

The present invention provides a number of important technical advantages. One example of an important technical advantage is that an image presented at a display is automatically adjusted based on the display orientation so that an end user views an upright image independent of the display orientation. Automatic adjustment of a display image based on display orientation improves the end user experience since manual adjustments are not needed while the display image is inverted or otherwise disoriented. Detection of display orientation with a mechanical sensor associated with a display support provides inexpensive and reliable automated display image orientation for known presentation orientations. Detection of display orientation with an electrical sensor, such as an accelerometer, provides flexibility in display presentation orientation at a variety of angles, such as by including keystone correction to the output image. Integrated support of automated display image orientation allows the end user to rearrange a display orientation over time without having to recall how to adjust image orientation each time the display is rearranged.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Automatically aligning an image presented at a display according to the orientation of the display simplifies the setup and use of an information handling system for processing and presenting visual information. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
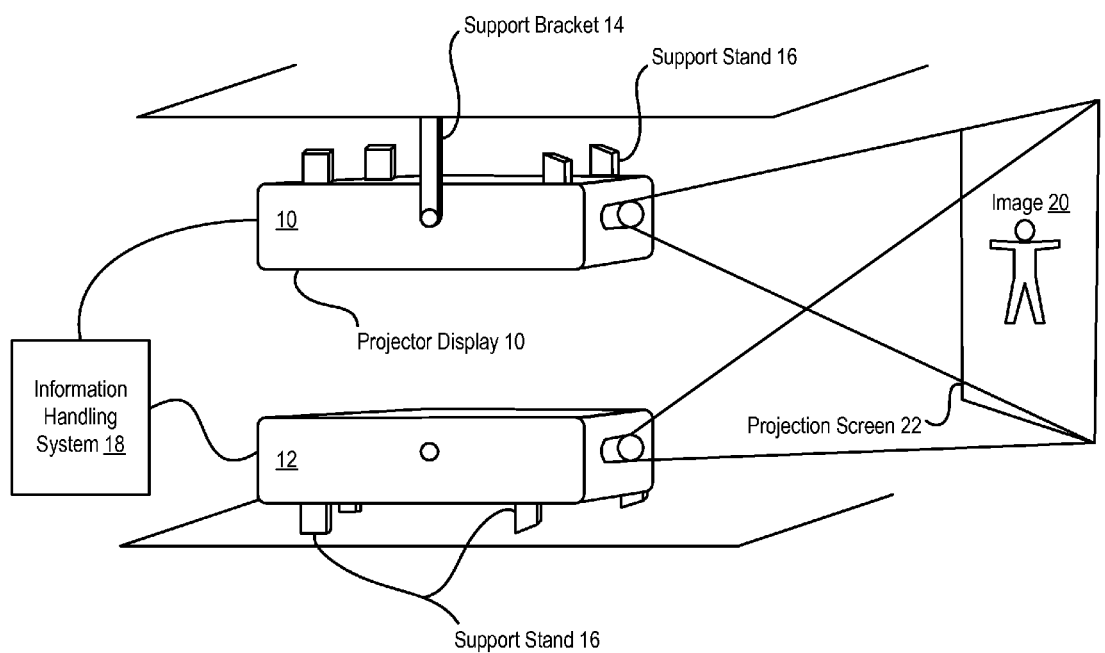
FIG. 1 depicts projector displays supported in an inverted orientation and resting on a tabletop in an upright orientation.

Referring now to FIG. 1, projector displays 10 and 12 are depicted supported in an inverted orientation and resting on a tabletop in an upright orientation. Projector display 10 is supported from a ceiling in an inverted orientation by a display support bracket 14. Although support bracket 14 is depicted coupled to the side surface of projector 10, in other embodiments mechanical support brackets 14 couple at other positions, such as the bottom surface of projector 10. Projector display 12 is supported on a tabletop in an upright orientation with support stands 16. An information handling system 18 provides visual information to projectors 10 and 12, such as streaming video, which is presented by projectors 10 and 12 as an image 20 at a distal projection screen 22 or other display surface. In order to support projection of image 20 in both the upright orientation of projector 12 and the inverted orientation of projector 10, a display orientation module running on each projector automatically aligns image 20 according to a sensed orientation of the projector. For example, projector 12 in the upright orientation presents image 20 in an upright orientation while projector 10 in the inverted orientation presents image 20 in an inverted orientation so that image 20 appears upright at projection screen 22.

Figure 2A:
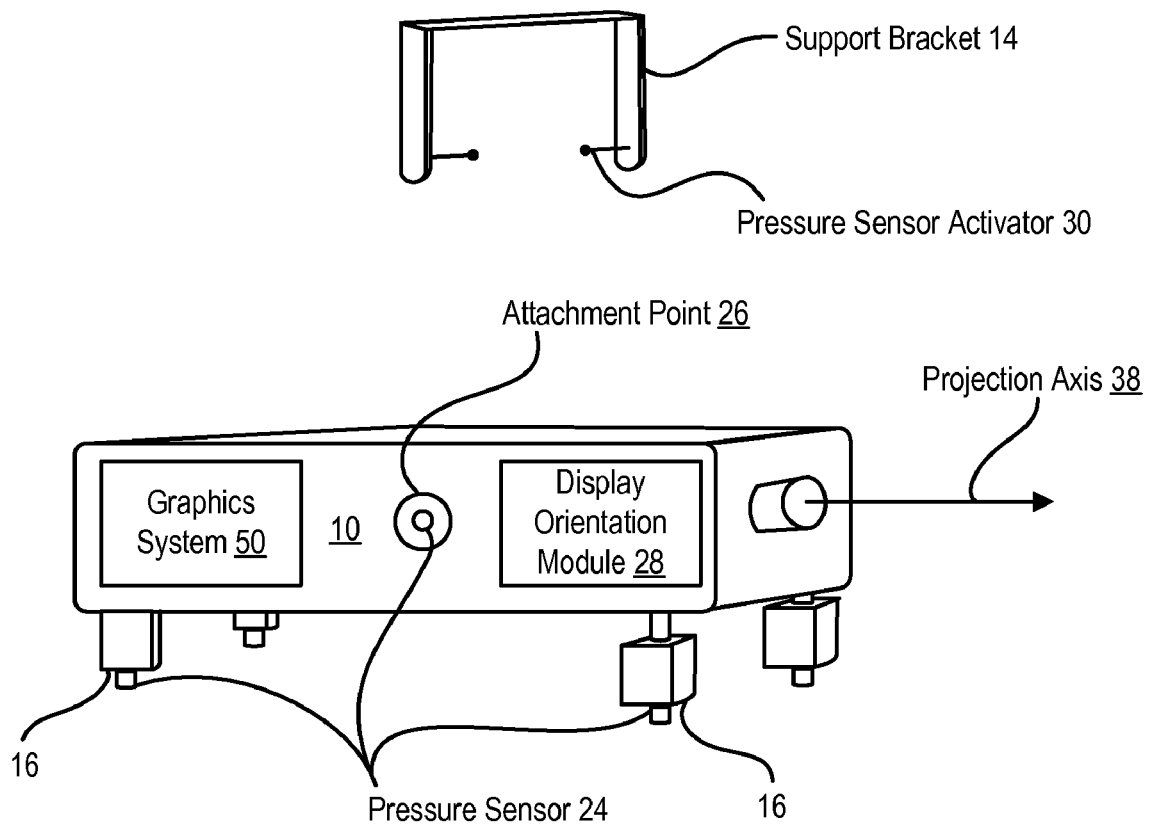
FIG. 2A depicts a block diagram of a projector display in an upright orientation and having automated display image orientation by mechanical sensing of display orientation.
Figure 2B:
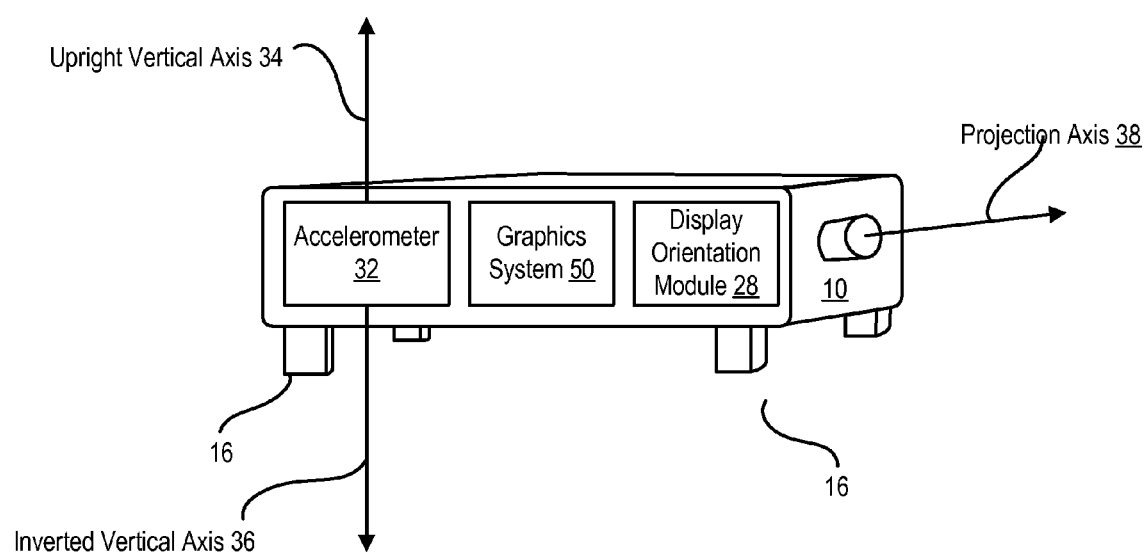
FIG. 2B depicts a block diagram of a projector display in an upright orientation and having automated display image orientation by accelerometer sensing of display orientation.

Referring now to FIG. 2A, a block diagram depicts a projector display in an upright orientation and having automated display image orientation by mechanical sensing of display orientation. A graphics system 50 formats an output image for presentation at a display surface, such as with visual information communicated from an information handling system. The orientation of projector 10 is automatically sensed by a display orientation sensor so that the image presented by graphics system 50 aligns according to the sensed orientation of projector 10. Automated display image orientation is provided by pressure sensors 24 disposed in support stands 16 and at an attachment point 26 of projector 10. When projector 10 rests on support stands 16, its weight activates mechanical switches in pressure sensors 24 that signal a display orientation module 28 that projector 10 is in an upright orientation. Display orientation module 28 provides the orientation to graphics system 50 which presents output images from projector 10 in an upright orientation to match the orientation of projector 10 as detected by sensors 24. When projector 10 is supported in an inverted orientation by support bracket 14, a pressure sensor actuator 30 extends into attachment point 26 to activate a pressure sensor 24 disposed in attachment point 26. Activation of pressure sensor 24 within attachment point 26 signals display orientation module 28 that projector 10 is supported in an inverted orientation, such as hung from a ceiling as depicted in FIG. 1. Display orientation module 28 sends an inversion signal to graphics system 50, which inverts the output image presented by projector 10 so that, with the inverted orientation of projector 10, the image appears upright.

Referring now to FIG. 2A, as an alternative to the mechanical pressure sensor 24, an integrated accelerometer 32 may be used as a display orientation sensor. For example, accelerometer 32 is a three-dimensional accelerometer available from Kionix, Inc. that is used in hard disk drives. In one embodiment, accelerometer 32 resolves the axis of gravitational pull and determines if the axis of gravitational pull aligns more closely with an upright vertical axis 34 or an inverted vertical axis 36. Display orientation module 28 communicates the display orientation to graphics system 50, which orients the image presented from projector 10 to align with the appropriate upright or inverted axis. Alternatively, accelerometer 32 resolves the relative angle between a projection axis 38 aligned with the vector of projection from projector 10 and the vector of gravitational pull so that the output image presented from projector 10 by graphics system 50 are corrected by display orientation module 28 to be upright relative to the vector of gravitational pull. Three dimensional resolution of the gravitational vector allows display orientation module 28 to correct not only for rotation about projection axis 38, but also to correct for rotation about perpendicular vertical and horizontal axes so that an estimation of keystone correction is made based upon a presumption of a projection screen 22 aligned with the gravitational vector. Display orientation module 28 applies the relative angle from the detected gravitational axis so that graphics system 50 corrects to output image to appear undistorted at a distal display surface assumed to be aligned with the gravitational axis, including keystone correction.

Figure 3:
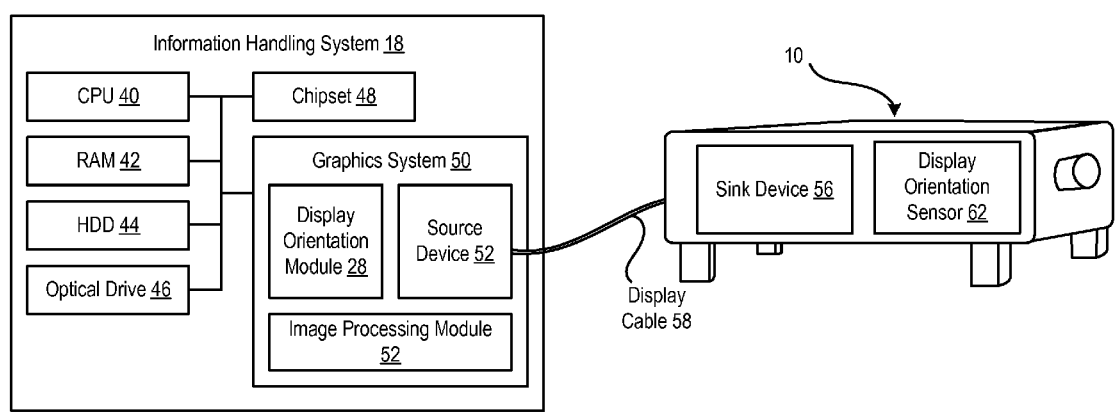
FIG. 3 depicts a block diagram of a system for aligning an image presented by a display with a video source display correction based on display orientation communicated from the display to the video source.

Referring now to FIG. 3, block diagram depicts a system for aligning an image presented by a display with a video source display correction based on display orientation communicated from the display to the video source. Information handling system 10 is built from plural processing components operable to process visual information for presentation at a display, such as a CPU 40, RAM 42, a hard disk drive (HDD) 44, an optical drive 46, a chipset 48 and a graphics system 50. A source device 54 of graphics system 50 sends visual information generated by an image processing module 52 to a sink device 56 of display 10 through a display cable 58. Display cable 58 is, for example, a DisplayPort compliant cable having a unidirectional main link for communicating visual information from information handling system 18 to display 10 and a bidirectional auxiliary link for communicating control information between source device 54 and sink device 56. The visual information is presented by sink device 56 as output images by display 10, such as images presented at a projection screen. A display orientation sensor 62 associated with display 10 determines the orientation of display 10 and provides the orientation through sink device 56 to source device 54 through the auxiliary channel of display cable 56. A display orientation module 28 applies the display orientation provided to source device 52 to adjust the visual information so that the visual information is presented from display 10 to have an image orientation that aligns with the detected display orientation. As an example, an inversion signal sent from display orientation sensor 62 received at display orientation module 28 is applied to invert the visual information generated by image processing module 52. Thus, corrections to the image orientation based on a sensed display orientation are performed at the video source rather than at the display itself. Display orientation sensor 62 provides an electrical signal to the sink device of display 58, such as at a timing controller, which is packetized and sent as a control packet through the auxiliary channel of the DisplayPort cable. For example, with a mechanical display orientation sensor 62 a predetermined signal is sent from the sink device so that activation of a specific orientation pressure sensor indicates a display orientation associated with that sensor. In an alternative embodiment, an accelerometer display orientation sensor provides a signal to the sink device based upon the closest aligned axis. For example, if the display orientation is closer to the landscape orientation, a first signal is sent to a first timing controller pin, and if the display orientation is closer to the portrait orientation, a second signal is sent to a second controller pin. A packetized control command sent from the timing controller through the auxiliary channel indicates to display orientation module 28 the desired image orientation.

Although the present invention has been described in detail, it should be understood that various changes, substitutions and alterations can be made hereto without departing from the spirit and scope of the invention as defined by the appended claims.

What is claimed is:

1. A projector for presenting an output image on a display surface, the projector having a projector orientation, the projector comprising: a graphics system operable to format the output image for presentation at a display surface, the output image having an image orientation;

a projector orientation sensor operable to detect the projector orientation as an upright orientation or an inverted orientation relative to a vertical axis; and a projector orientation module interfaced with the graphics system and the projector orientation sensor, the projector orientation module operable to automatically adjust the image orientation according to the projector orientation sensed by the projector orientation sensor to present the image upright relative to the vertical axis; and a projector support operable to couple to the projector at one or more attachment points, each attachment point associated with a projector orientation and wherein the projector orientation sensor comprises a sensor operable to detect coupling of projector support at the one or more attachment points, the projector orientation sensor determining the projector orientation from the projector orientation associated with an attachment point coupled to the projector.

2. A projector for displaying visual information communicated from a video source at a display surface, the projector having a projector orientation, the projector comprising:

a graphics system operable to generate output images from the visual information and to format the output images for presentation at a display surface, the output images having an image orientation associated with the visual information; a projector orientation sensor operable to detect the projector orientation as an upright orientation or an inverted orientation; and a projector orientation module interfaced with the graphics system and the projector orientation sensor, the projector orientation module operable to generate automatic adjustments to the image orientation according to the projector orientation sensed by the projector orientation sensor, the projector orientation module communicating the image orientation adjustments to the video source for adjusting the visual information; and a projector support operable to couple to the projector at one or more attachment points, each attachment point associated with a projector orientation and wherein the projector orientation sensor comprises a sensor operable to detect coupling of projector support at the one or more attachment points, the projector orientation sensor determining the projector orientation from the projector orientation associated with an attachment point coupled to the projector.

3. A method for adjusting a projector image orientation to a projector orientation, the method comprising:

detecting a projector orientation with a sensor associated with the projector as upright or inverted; determining an image orientation aligned according to the detected projector orientation; and automatically presenting an image from the projector at the determined image orientation; wherein detecting a projector orientation further comprises sensing that a support device is coupled to an attachment point of the projector, the attachment point associated with a predetermined projector orientation.

4. The method of claim 3 wherein detecting a projector orientation further comprises: detecting a position of the projector relative to a projector support; and determining the projector orientation from the difference between the position of the projector relative to the projector support and a predetermined axis associated with the projector support.

5. A system for aligning an image orientation of an image presented by a projector with a projector orientation of the projector, the system comprising: a projector orientation sensor associated with the projector and operable to determine an inverted orientation of the projector relative to a vertical axis; and a projector orientation module interfaced with the projector orientation sensor and operable to automatically align the image presented by the projector with the orientation of the projector sensed by the projector orientation sensor to present the image upright relative to the vertical axis: wherein the projector orientation sensor comprises: one or more actuators associated with a projector support each actuator associated with a predetermined projector orientation; and one or more sensors associated with the projector, the sensors arranged to align with actuators if the projector support couples the projector in the predetermined projector orientation.

* * * * *